United States Patent [19]
Gast

[11] 3,865,477
[45] Feb. 11, 1975

[54] NAVIGATION DEVICE
[76] Inventor: Fred C. Gast, 15 Cerro Verde Dr., Ocean Springs, Miss. 39564
[22] Filed: Feb. 12, 1971
[21] Appl. No.: 115,019

[52] U.S. Cl. .................. 353/11, 353/40, 353/42, 353/44, 353/76
[51] Int. Cl. ................. G03b 21/00, G03b 21/26
[58] Field of Search ....... 353/40, 42, 44, 76, 11–14; 33/1 M, 1 SB, 1 SD, 30; 73/178 R

[56] References Cited
UNITED STATES PATENTS

| | | | |
|---|---|---|---|
| 2,209,191 | 7/1940 | Dearing | 33/224 |
| 2,314,497 | 3/1943 | Hargrave | 353/11 |
| 2,364,731 | 12/1944 | Luck | 33/1 SD |
| 2,423,513 | 7/1947 | Meyer | 353/12 |
| 2,600,261 | 6/1952 | Pennington | 353/30 |
| 2,608,094 | 8/1952 | Best | 353/12 |
| 2,791,152 | 5/1957 | Durant | 353/11 |
| 3,016,791 | 1/1964 | Van Inwagen | 353/42 |
| 3,134,295 | 5/1964 | Brown | 353/12 |
| 3,175,460 | 3/1965 | Homick | 353/12 |
| 3,208,336 | 9/1965 | Vago | 353/12 |
| 3,228,281 | 7/1966 | Holt | 73/178 R |
| 3,373,493 | 3/1968 | McDonald | 33/1 SD |

FOREIGN PATENTS OR APPLICATIONS

| | | | |
|---|---|---|---|
| 856,256 | 7/1940 | France | 353/11 |
| 1,473,947 | 4/1969 | Germany | 353/11 |

Primary Examiner—Harry N. Haroian
Assistant Examiner—A. J. Mirabito
Attorney, Agent, or Firm—Elliot A. Lackenbach

[57] ABSTRACT

Navigational device for projecting a navigational chart on a screen and means for enabling manual superimposing of bearing-defining lines thereon so that positions and lines of departure may be determined quickly and easily without pencils, compasses, protractors, or any other loose instruments.

40 Claims, 14 Drawing Figures

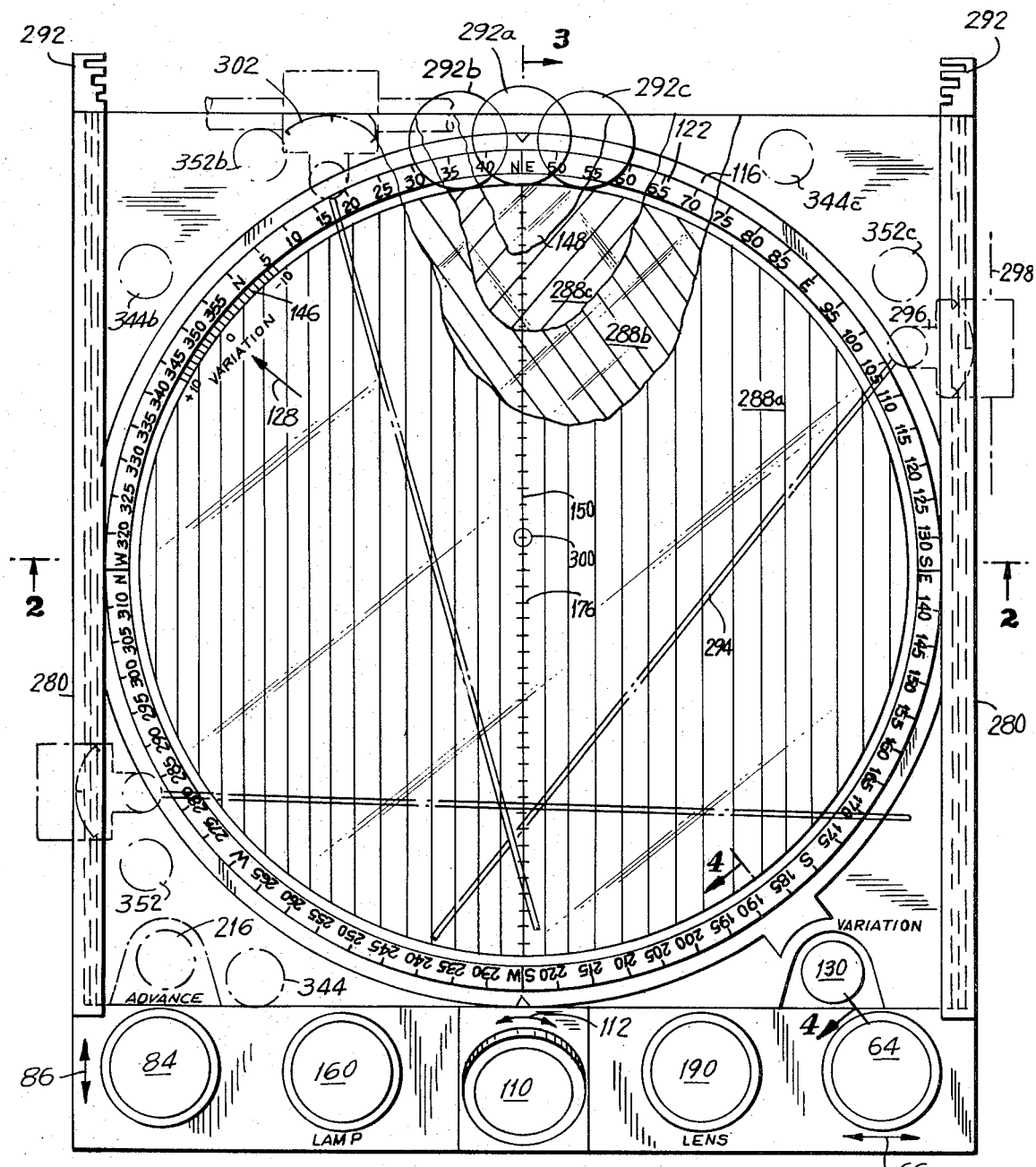

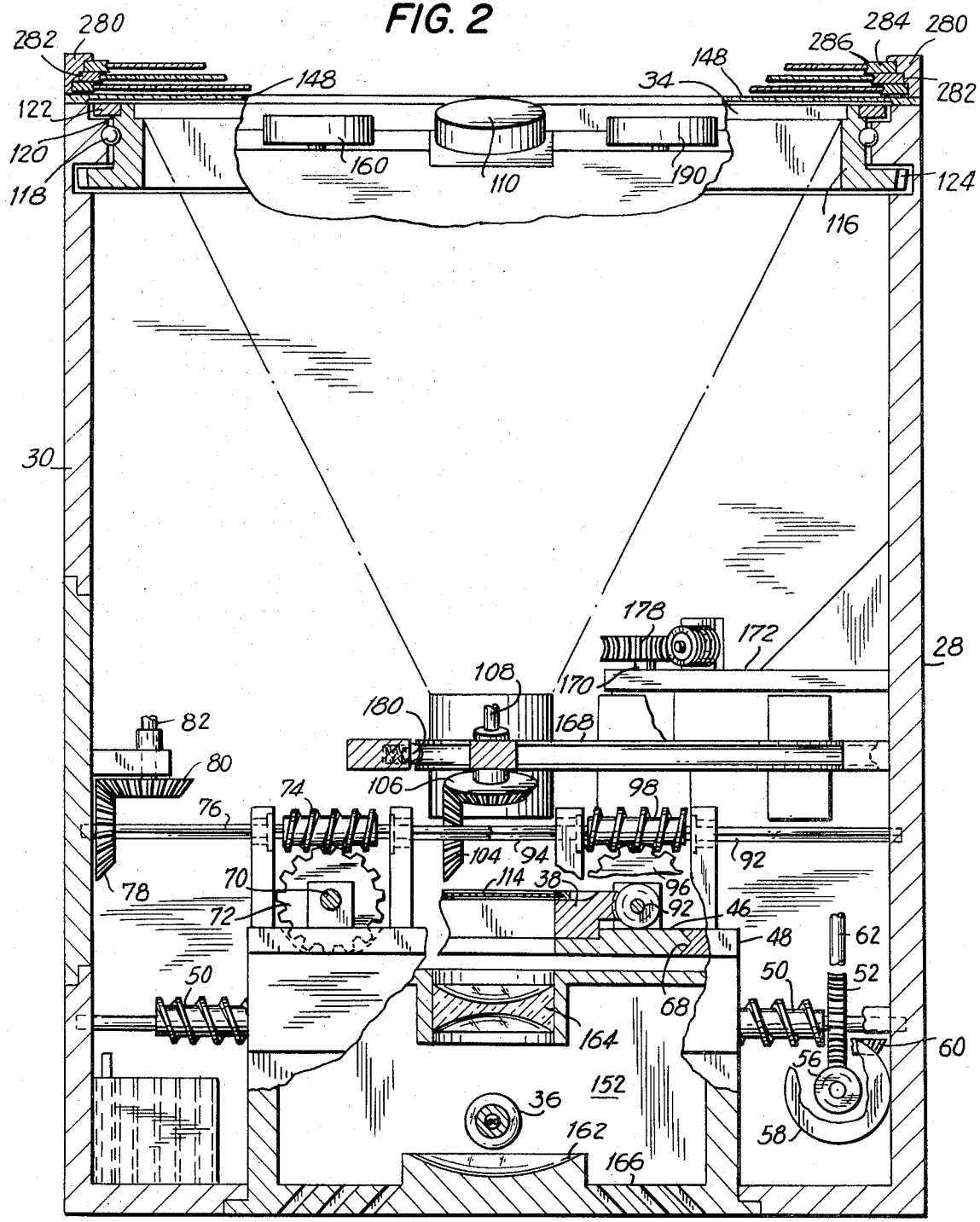

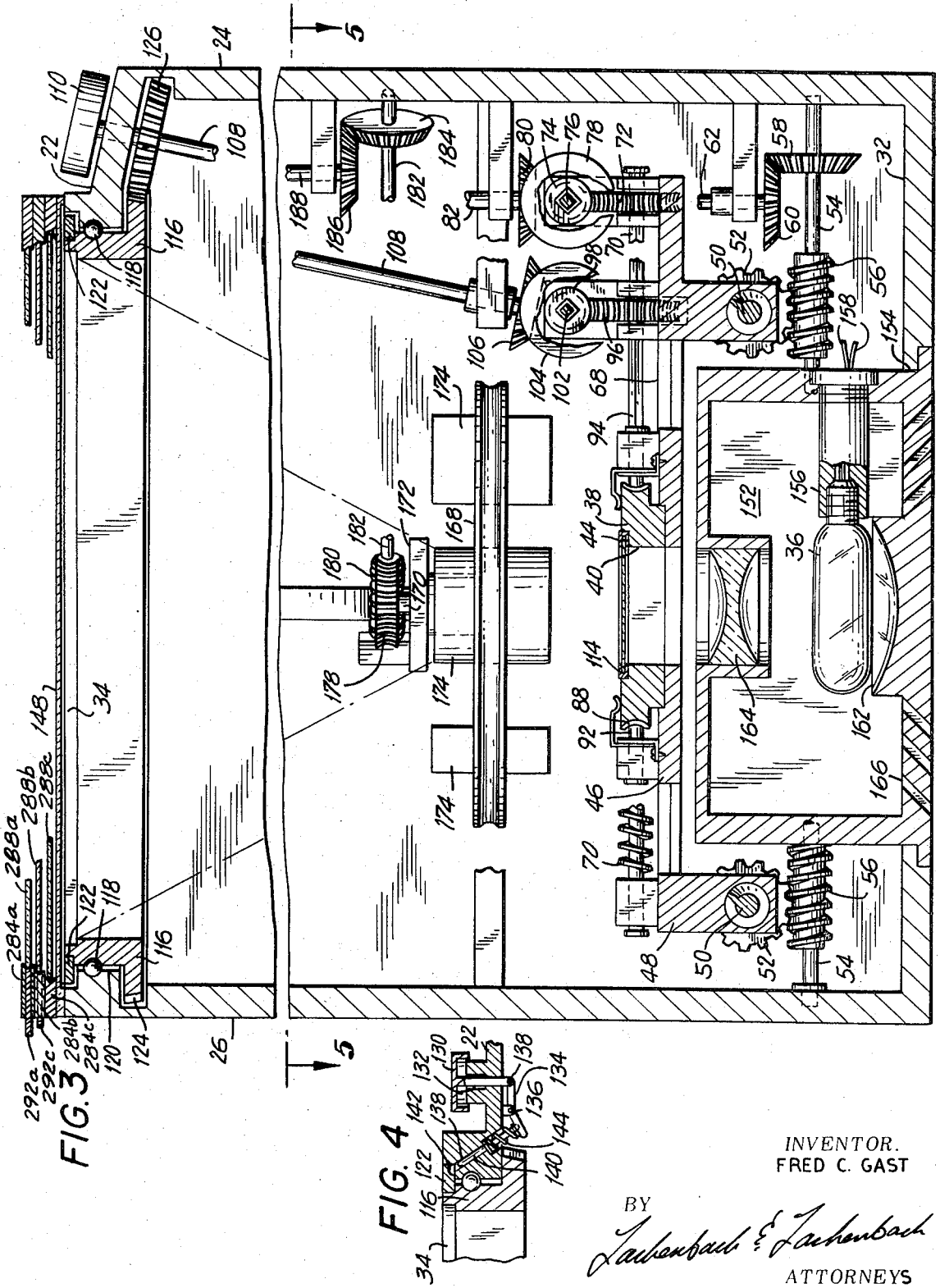

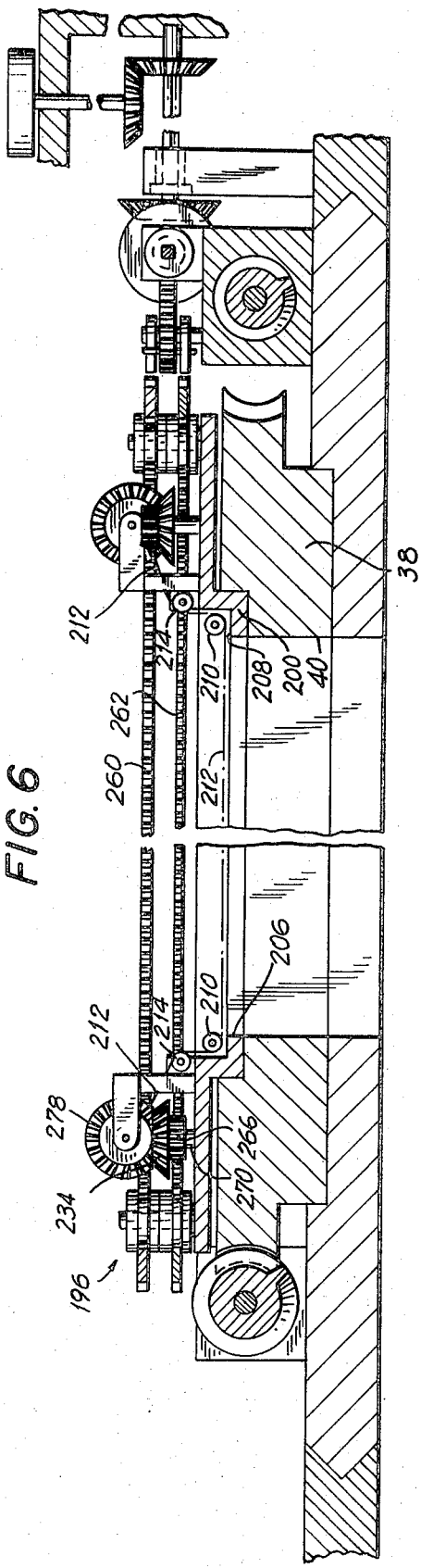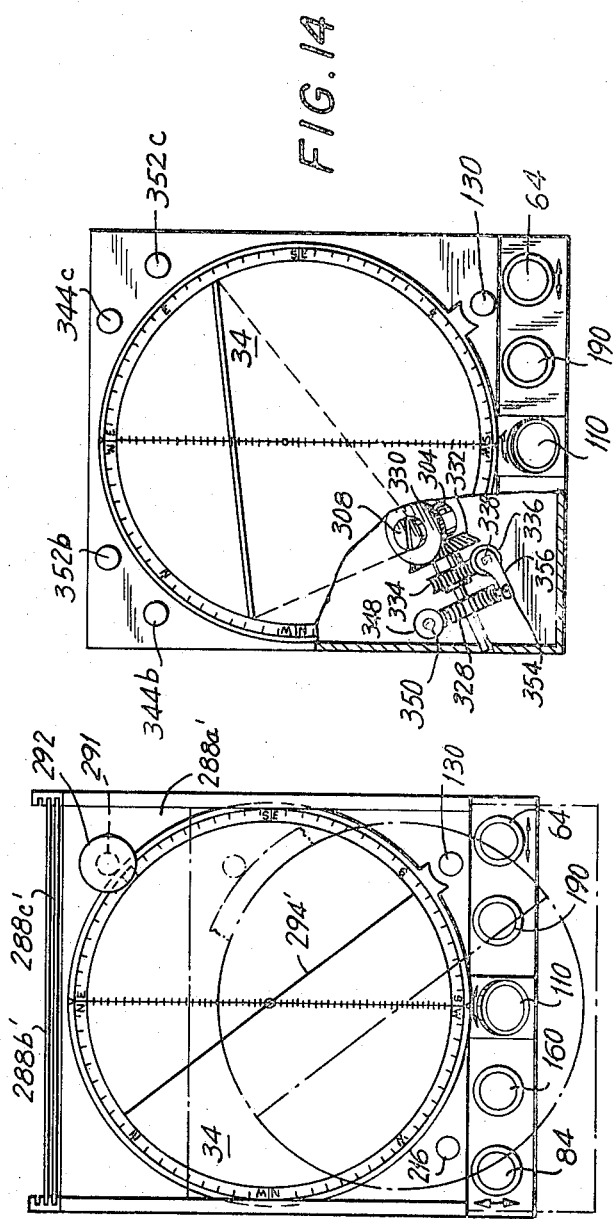

3,865,477
PATENTED FEB 11 1975
SHEET 6 OF 6
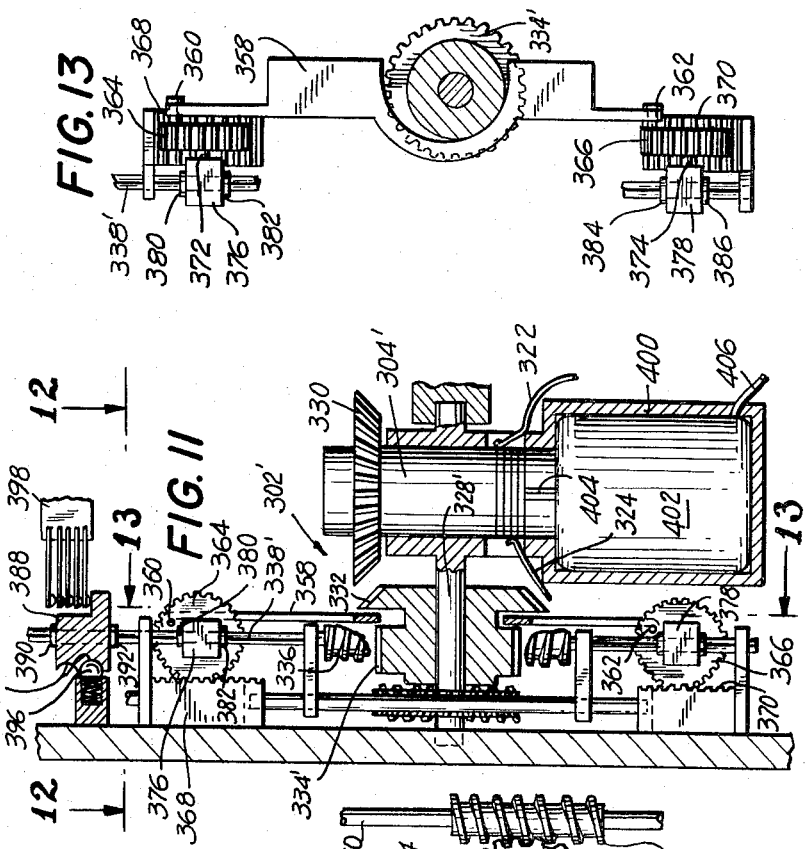
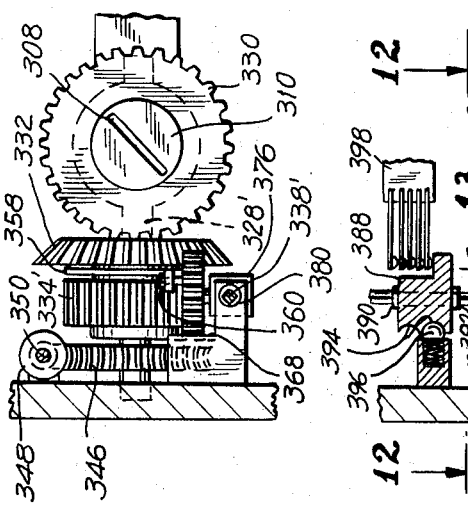
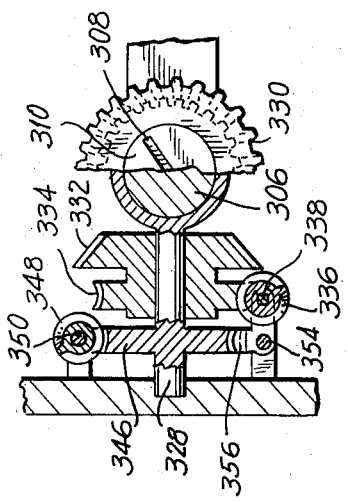
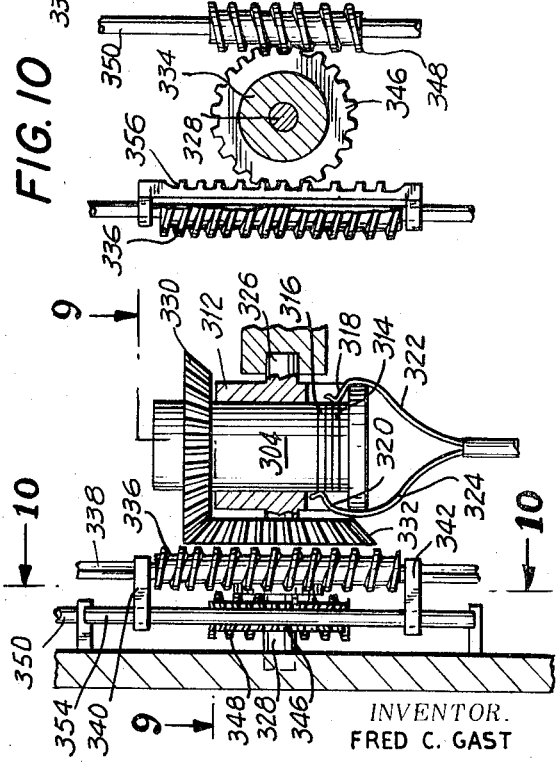
INVENTOR.
FRED C. GAST
BY
*Lackenbach & Lackenbach*
ATTORNEYS

NAVIGATION DEVICE

This invention relates to navigational devices and, more particularly, to manually operable navigational charting or plotting devices.

Traditionally, navigational plotting is undertaken utilizing paper or cloth mounted charts of substantial size wherein lines corresponding to relative bearings are plotted directly thereon or on transparent overlays utilizing a pencil or grease pencil, protractors, parallel rules and straight edges. Such manual plotting of position is relatively time-consuming and, moreover, conventional chart tables and the auxiliary instruments required therewith, together with an appropriate file of necessary charts are expensive and require a substantial amount of space. Hence, the ability to navigate accurately in small craft such as airplanes and small boats has been difficult. Larger craft, in addition to being able to maintain a proper charting station have also been able to utilize relatively complex and expensive electronic navigational aids. The small craft, whether it be aircraft or small boats, as well as similar non-craft uses, such as for survey work, field artillery, or other related uses, have not been able to utilize such complex aids and, due to space and weather problems often find conventional plotting impractical. It is, therefore, a primary object of the present invention to provide method and apparatus for enabling navigation plotting to be performed rapidly and easily without requiring any loose drawing instruments or charts.

Another primary object of the present invention, in addition to each of the foregoing objects, is the provision of novel methods and apparatus for enabling the photographic reproduction of a substantial number of charts in a small space at an economical cost.

Yet still another primary object of the present invention, in addition to each of the foregoing objects, is the provision of such novel apparatus which is relatively light, self-contained and compact and substantially immune to weather conditions.

Yet still another primary object of the present invention, in addition to each of the foregoing objects, is the provision, as a navigational device, of a rear image slide projector having means to enable manipulating the slide and manually settable means for indicating relative bearings on the screen.

Still another primary object of the present invention, in addition to each of the foregoing objects, is to provide such navigational device having a plurality of magnifications with a retical projecting the appropriate scale on the screen for each of the magnifications.

Yet still another primary object of the present invention, in addition to each of the foregoing objects, is to provide such navigational device having a settable compass rose extending around the periphery of the screen.

Another and further primary object of the present invention, in addition to each of the foregoing objects, is the provision of such a navigational instrument or device of means to enter the appropriate variation therein.

Another and yet still further primary object of the present invention, in addition to each of the foregoing objects, is the provision of such navigational device having pointers movably associated with the screen for manual setting to indicate relative bearings.

Yet another and still further primary object of the present invention, in addition to each of the foregoing objects, is the provision of such navigational instruments constructed and arranged to enable the utilization therein of roll film strip maps.

Yet still a further primary object of the present invention, in addition to each of the foregoing objects, is the provision of such navigation device having a plurality of reticals for projecting lines on such screen for indicating relative bearings.

Yet another and still further primary object of the present invention, in addition to each of the foregoing objects, is the provision of such navigational device wherein the projected chart may be moved simultaneously independently in at least two perpendicular directions generally parallel said screen and, in addition, be rotated relative thereto.

Another and still further primary object of the present invention, in addition to each of the foregoing objects, is the provision of such navigation device having a plurality of grids rotatably mounted in alignment with said screen for indicating relative bearings.

Yet another and still further primary object of the present invention, in addition to each of the foregoing objects, is the provision of such navigational device of relative bearing markers constructed and arranged to be set for a desired angle of orientation and then moved to any desired position relative the screen thereof.

Still further, it is another primary object of the present invention in addition to each of the foregoing objects, to provide navigational devices projecting a chart image from a film transparency to a screen, means for moving the film transparency in a first direction generally parallel the screen comprising an outer frame movable along a plurality of parallel screw threaded shafts rotatably carried by the housing and rotatable from externally thereof through a gear system.

Still another primary object of the present invention, in addition to ech of the foregoing objects, each the provision in such a navigational device of means for moving the film transparency in a direction generally perpendicular the first-mentioned direction and parallel the screen comprising an inner frame slidably mounted to said first-mentioned frame for movement generally perpendicular the direction of movement with said first-mentioned frame relative thereto by means of a screw-threaded shaft rotatably carried by said first-mentioned frame, gearing associated with the inner frame screw-threaded shaft for rotation about an axis generally parallel the outer frame screw-threaded shaft, a splined shaft engaging said last-mentioned gearing rotatably carried by said housing and means for rotating said splined shaft from external said housing.

A yet further primary object of the present invention, in addition to each of the foregoing objects, is the provision in such navigation device of means for providing rotation of the chart transparency comprising a rotational frame rotatably carried by said inner frame having peripheral gear teeth engaged with a worm rotatably carried by said inner frame on a splined shaft generally parallel said inner frame drive screw, a worm gear rotationally carried by said outer frame slidably engaged with said splined shaft for rotation therewith and engaged with a worm carried on a splined shaft generally parallel said outer frame drive screw and gear means slidably engaged with said last-mentioned splined shaft for rotation from outside the housing.

Another and yet still further primary object of the present invention, in addition to each of the foregoing objects, is the provision of such navigation device having means to enable the utilization of chart transparencies in roll form and means for positioning a desired portion of the roll or strip transparency for projection and viewing.

The invention resides in the combination, construction, arrangement and disposition of the various component parts and elements incorporated in improved navigation devices constructed in accordance with the principles of this invention and in methods of navigation practiced thereby. The present invention will be better understood and objects and important features other than those specifically enumerated above will become apparent when consideration is given to the following details and description, which when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

IN THE DRAWING:

FIG. 1 is a top plan view of a navigation device in accordance with the present invention;

FIG. 2 is a front elevational cross-sectional view taken along line 2—2 of FIG. 1;

FIG. 3 is a side elevational cross-sectional view taken along line 3—3 of FIG. 1;

FIG. 4 is a cross-sectional elevational partial view taken along line 4—4 of FIG. 1;

FIG. 6 is an enlarged partial elevational cross-sectional view taken along line 6—6 of FIG. 5;

FIG. 7 is a top plan view of another modified device in accordance with the present invention incorporating a different form of line of position indicators;

FIG. 8 is an elevational view of a light line projector that may be utilized in the present invention for indicating or displaying relative bearings or lines of position;

FIG. 9 is a cross-sectional plan view taken along line 9—9 of FIG. 8;

FIG. 10 is an elevational cross-sectional view taken along line 10—10 of FIG. 8;

FIG. 11 is a side elevational view of another line projector which may be utilized to indicate relative bearings in the present invention;

FIG. 12 is a cross-sectional plan view taken along line 12—12 of FIG. 11;

FIG. 13 is an elevational cross-sectional view taken along line 13—13 of FIG. 11; and FIG. 14 is a top plan view of a device in accordance with the present invention incorporating the light line projections previously shown.

Figure 5:
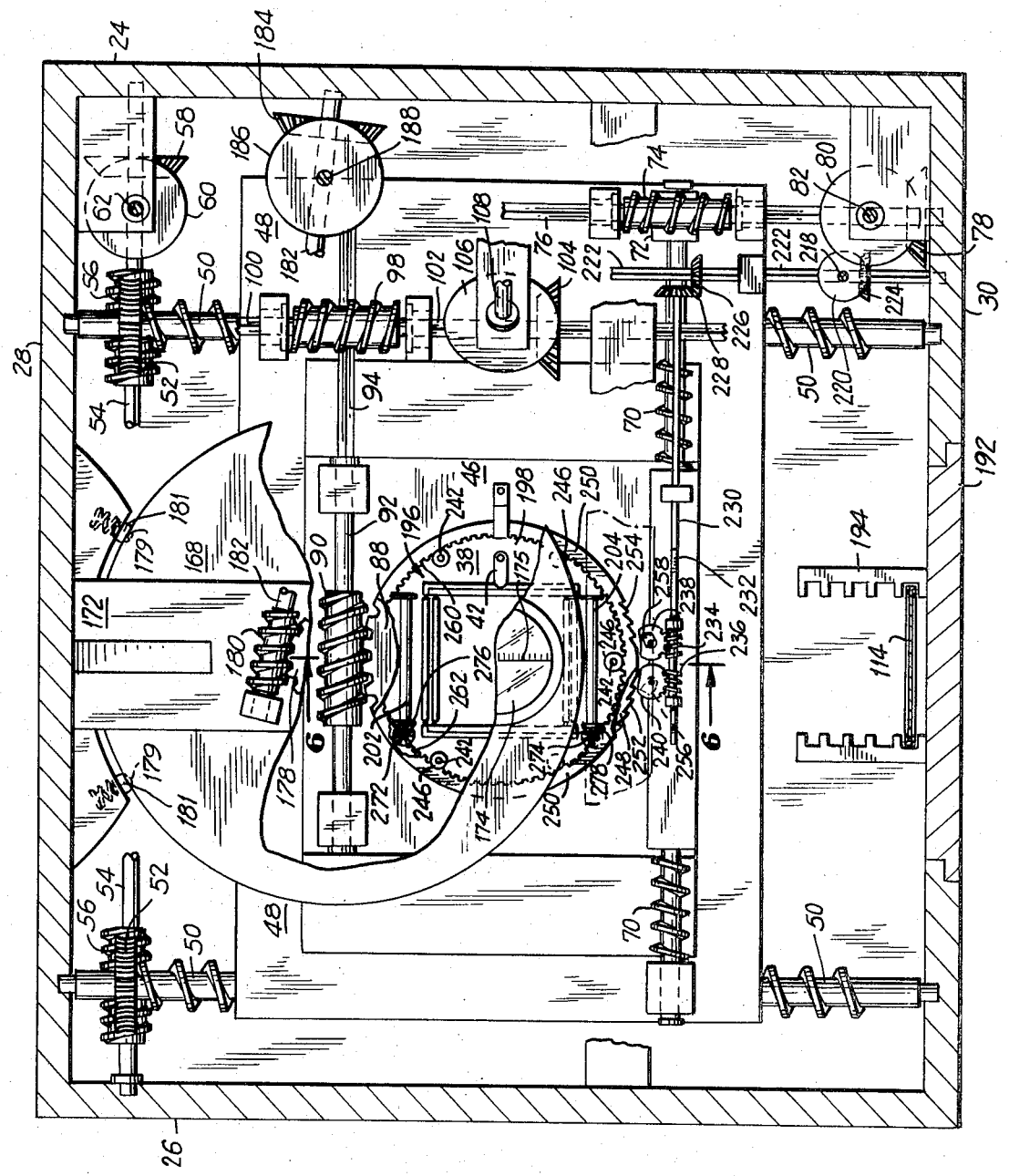
FIG. 5 is a cross-sectional plan view taken along line 5—5 of FIG. 3 showing a modified device including a roll film attachment.

With reference now to the drawing, and particularly FIGS. 1-4, there is shown and illustrated a navigation device constructed in accordance with the principles of the present invention and designated generally by the reference character 20. The device 20 is particularly adapted for use, for example, in vehicles such as small aircraft or small boats to enable charting operations to be carried on by the operator, pilot or navigator thereof readily and easily without requiring the use of conventional charts, protractors, dividers, parallel rulers, pencils, and the like. To accomplish the foregoing, the navigation device is constructed and arranged to project from a small transparency such as a photographic transparency, a navigational chart enlarged upon a rear projection screen and, simultaneously with the display of the projected enlarged chart, lines of position or relative bearing similar to those which would be drawn by the conventional navigational practices to depict the relative bearings determined, for example, by a conventional sighting compass, to known landmarks or position points on the chart so that the intersection of the displayed lines of position will indicate the position of the craft or, alternatively, to depict the line of departure to a desired point to indicate the correct course thereto. The lines of position may be provided, in accordance with the present invention, in several different ways as, for example, by means of a plurality of rotatable grids superimposed over the screen, by means of movable rod-like fingers or pointers which may be disposed over the screen, by means of lines of light or shadow projected on the screen simultaneously with the chart image, and the like. Specific examples of each of these types of lines of position or relative bearing markers are shown in the drawing and will be further described hereinafter. Because of the sighting errors and tolerances which are necessarily involved in positioning by triangulation, as well as to provide an indication if an incorrect reading is made by the navigator or pilot, there are preferably provided in the present invention three line of position or relative bearing markers or indicators so that if sightings are taken to three known or fixed objects and the line of position or relative bearing markers or indicators are set to the three bearings sighted, they will define a triangular zone wherein the vehicle lies or, if the triangular zone of location is excessive, this will serve to indicate that at least one of the readings is incorrect. Further, by the provision of three line of position or relative bearing markers or indicators, once the location of the craft is known, only two markers or indictors are necessary to define that location and the third marker or indicator may be set to extend between the craft location on the chart and the desired destination location on the chart and the relative bearing thereof will indicate the desired course.

While the present invention is particularly adapted for use in vehicles and small craft such as small aircraft and small boats, it is to be particularly emphasized that the present invention is not to be deemed limited to such use but is equally suitable for use in any undertaking wherein positional information is required, such as, for example, artillery control, field survey work, rescue work, and the like. Moreover, in contemplation of its major usage, all of the controls of the illustrated device are manually operable in nature. However, it is to be expressly understood that any or all of the controls of the illustrated device may be mechanized or motorized and even remotely controlled manually or automatically.

Accordingly, the device 20 comprises a generally rectangular housing having a top plate 22, a front wall 24, a rear wall 26, side walls 28 and 30 and a bottom wall 32.

A generally circular recess may be provided in the top wall 22 and a rear image projection screen 34 constructed of a transparent material having a translucent finish on the rearward surface thereof such as etched glass or plastic so that an image projected on the back, rearward or etched surface of the screen 34 will be visible from the front surface thereof.

A projection lamp 36 is disposed within the housing of the device 20 such as being disposed adjacent the lower or bottom wall 32 thereof so as to be spaced apart from the projection screen 34 as far as possible for maximum magnification and evenness of illumination. Various lenses, to be described hereinafter, are also provided within the housing between the projection lamp 36 and the projection screen 34 so as to focus the light rays from the projection lamp 36 on the rearward surface of the screen 34.

Along the optical axis between the projection lamp 36 and the projection screen 34, there may be provided means for supporting and moving a chart transparency so as to enable any portion of the chart transparency to be projected to a desired portion of the screen 34 in the desired orientation. Such chart transparency supporting means may comprise a slide holder plate 38 having an aperture 40 through which the light may pass and which may be provided with means, such as a plurality of clips 42 for enabling a photographic transparency or slide to be removably retained associated therewith, as, for example, within a recess 44. The slide holder plate may be rotatably carried on an inner frame 46 which in turn may be slidably carried on an outer frame 48 for movement relative thereto in a first direction and the outer frame 48 may be movably supported within the housing of the device 20 for movement in a direction perpendicular the movement of the inner frame 36 relative thereto. Hence, any combination of movement, fore and aft, side to side and rotation may be accommodated by the movement of the outer frame 48, the inner frame 46 and the slide holder plate 38.

For example, the outer frame 48 may be mounted to provide movement in a side to side direction and may be carried on a pair of screw threaded shafts 50 rotatably supported at their end portions by the side walls 28 and 30 in generally parallel spaced apart relationship with the outer frame 48 being provided with cooperating nuts or internally threaded means engaged therewith so that, upon rotation of the screw threaded shafts 50, the outer frame 48 will be reciprocated or moved side to side within the housing of the device 20. Each of the shafts 50 may be provided, for example, adjacent one end thereof, with a worm gear 52 mounted for rotation therwith in general alignment one with the other. A worm shaft 54 carrying a pair of worms 56 engaged with the worm gears 52 may be provided extending generally perpendicular the shaft 50 so that, upon rotation of the worm shaft 54, the screw threaded shafts 50 will be rotated thereby at a reduced rotational velocity. The worm shaft 54 may be rotatably supported by the front and rear walls 24 and 26, respectively, of the device 20. A bevel gear 58 may be mountd with the worm shaft 54 for rotation therewith adjacent one end portion thereof and a mating bevel gear 60 may be engaged therewith and rotatably carried on a generally perpendicular shaft 62 extending upwardly through the top wall 22 of the housing of the device 20 and provided on its external end with a control knob 64 appropriately marked to indicate that rotation thereof will provide side to side movement of the outer frame 48. For example, a directional arrow 66 may be provided on the top wall 22 adjacent the control knob 64 pointing in a side to side direction indicating the motion which will be produced by rotation of that knob.

As heretofore pointed out, the inner frame 46 may be carried by the outer frame 48 and preferably is slidable relative thereto generally perpendicular the screw threaded shafts 50. Hence, the outer frame 48 may be provided with a generally rectangular slot or aperture 68 within which the inner frame 46 reciprocates and the outer frame 48 may rotatably carry a screw threaded shaft 70 generally adjacent and screw threadedly engaged with the inner frame 46 so that, upon rotation of the screw threaded shaft 70, the inner frame 46 will be reciprocated in a front to back direction relative the outer frame 48 and, hence, relative the housing of the device 20. The inner frame 46 and the slot 68 may, as shown, (FIG. 5) mate, as by being of V-shaped cross-sectional configuration, as shown, tongue in groove, and the like, to retain the vertical positioning of the inner frame 46 relative the outer frame 48.

The screw threaded shaft 70 may be provided, at one end portion thereof, with a worm gear mounted for rotation therewith which may be engaged with a worm 74 adapted to be rotated by a spline or square shaft 76 so as to be movable therealong during movement of the outer frame 48 and rotated upon rotation of the square or splined shaft 76 regardless of its position therealong. The shaft 76 is generally parallel the screw threaded shaft 50 so that, during rotation of the threaded shaft 50, the outer frame and the worm 74 will be slid relative the shaft 76. The shaft 76 may be supported by the side walls 28 and 30. One end portion of the square shaft 76 may be provided with a bevelled gear 78 which may be engaged with a mating bevelled gear 80 secured with a generally vertical shaft 82 which projects upwardly through the top wall 22 of the housing or casing and is provided on its upper or outboard end portion with a front-back control knob 14. Adjacent the front-back control knob 86 there may be provided an arrow 86 indicating the direction of movement of the inner frame 46 upon rotation thereof. Hence, upon rotation of the control knob 86, the shaft 82 and associated mating bevel gear 80 will be rotated to rotate the bevel gear 78, square 76 and worm gear 74 regardless of the worm gear 74 on the shaft 76. The rotation of the worm 74, in turn, will cause a reduced velocity rotation of the worm gear 72 and associated screw threaded shaft 70. Rotation of the screw threaded shaft 70 relative the inenr frame 46 will, therefore, cause the inner frame 46 to move generally forwardly or rearwardly or in a front-back relationship, depending upon the direction of rotation of the control knob 84.

Rotational movement of the slide holder plate or frame 38 may be effectuated by providing the periphery of the slide holder plate 38 with gear teeth to define a worm gear 88 meshed with a worm 90 for rotation with a shaft 92 rotatably carried by the inner frame 46. The outboard end portion or the portion of the shaft 92 extending outwardly of the inner frame 46 may be of the splined or square configuration slidably engaged with a worm gear 96 which is driven in turn by a worm 98 regardless of the relative position of the square shaft portion 94 relative thereto. The shaft 92 and square shaft portion 94 are preferably parallel the shaft 70 so that they extend in the direction of movement of the inner frame 46 relative the outer frame 48. The worm 98 is mounted for rotation with a shaft 100 rotatably carried by the outer frame 48 for movement therewith and having a square or splined portion 102 passing through a square or splined central aperture in a bevel gear 104 which is retained in position relative the housing so that the shaft splined or square portion 102 is free to slide therewithin and be rotated thereby. Meshed with the bevel gear 104, there may be provided a mating bevel gear 106 mounted for rotation with a control shaft 108 extending generally upwardly and somewhat angularly through the top wall 22 of the device wherein it is provided with a control knob 110 for controlling the rotational position of the slide holder plate 38 and which may, accordingly, be provided with an indicating arrow 112 disposed adjacent thereto for indicating that rotation of the control knob 110 results in rotation of the slide holder plate 38 and the resultant image on the screen 34. It will be readily seen that rotation of the control knob 110 will result in rotation of the shaft 100 through the control shaft 108 and bevel gears 104 and 106 regardless of the longitudinal position of the square or splined shaft 102 relative the gear 104. This rotation of the shaft 100 in turn results in rotation of the worm gear 98 to drive the shaft 92 at a reduced velocity through the worm gear 96, again regardless of the relative position of the square shaft portion 94 relative the worm gear 96. Rotation of the shaft 92 in turn provides rotation of the worm 90 and, thereby, the peripheral ring gear 88 and the slide holder plate 38.

Hence, if a slide or transparency 114 is disposed on the slide holder plate 38, by appropriate manipulation of the control knob 64, 84 and 110, the projected image on the screen 34 may be completely controlled, both as to position and angular orientation. The rear image projection screen 34 may be mounted in a generally annular screen housing 116 rotatably supported, as by means of ball bearings 118 in a generally circular aperture 120 extending downwardly through the top wall 22. Extending generally peripherally around the screen 34, as by being positioned, generally peripherally around the housing 116, there may be provided a direction indicating ring or compass ring 122 having inscribed or otherwise affixed to the upper surface thereof the various compass headings and degree markings. The ring 122 may be a friction fit around the periphery of the screen housing 116 so as to be frictionally rotated therewith. The screen housing 116 may be provided, as extending generally radially outwardly from its lower end portion, with generally bevelled ring gear teeth 124 meshed with a bevelled gear 126 mounted for rotation with the control shaft 108 so that, upon rotation of the control knob 110, not only will the slide holder plate 38 be rotated but the screen housing 116 and screen 34 will be rotated therewith, preferably by a proper selection of the gearing ratios, at the same rate. Then, the markings on the compass ring 122 will remain accurate relative the chart projected from the chart transparency. Further, the screen 34 may be provided with a line 128 to indicate north-south and each of the chart transparencies may be prepared so that the true north-south direction thereon is always in the same direction relative the frame. Then, regardless of the position of the compass ring 122 relative the screen 34, the true north-south direction will always be indicated. Since the screen is not movable relative the screen housing 116 and the screen housing 116 is locked to rotate with the slide holder plate 38 through the gearing therebetween, the line 128 will always remain properly oriented relative the chart transparency. To enable the compass ring 122 to be adjusted to indicate magnetic variations, or the like, means may be provided for enabling movement of the compass ring 122 relative the screen housing 116 against the frictional engagement therebetween. Such variation setting means may comprise, for example, a variation control button 130 (FIG. 4) disposed above the top wall 22 and having a shaft 132 extending generally downwardly therethrough. A lever arm 134 may be provided pivotally mounted, as by means of a pin 136 with the lower surface of the top wall 22 and having one end portion thereof pivotally connected, as by means of a pin 138 with the lower end portion of the control button shaft 132 so that, upon depression of the control button 130, the lever 134 will be rocked or rotated in a generally clockwise direction as seen in FIG. 4 so that the other end portion thereof will be raised towards the top wall 22. An oblique aperture 138 may be provided extending upwardly through the top wall 22 intersecting both the compass ring 122 and the other leg of the pivoted lever 134. A plunger 140 may be disposed within the aperture 138 having the lower end portion thereof engaged with the other arm of the lever 134 so as to be moved upwardly thereby upon depression of the variation control button 130 and the upper end portion thereof adapted to engage the compass ring 122 to lock the compass ring 122 relative the top wall 22 and prevent rotation thereof during rotation of the screen housing 116 and, thereby, enable the screen housing 116 and screen 134 to be moved relative thereto to provide for setting of variation. The compass ring 122 may be provided with serrations 142 for engagement by the upper end portion of the plunger 140 to securely lock the compass ring 122 relative the housing top wall 22 and biasing means such as a spring 144 may be provided for biasing the plunger 140 downwardly away from the compass ring 122 and, thereby, the variation control button 130 upwardly outwardly of the housing top wall 22. A variation indicating scale 146 may be inscribed on the screen 34 or screen housing 116 adjacent the compass ring 122 to enable the desired variation to be readily set. Thus, when the amount of variation that is correct for the chart is being used is set into the device by an appropriate movement of the compass ring 22 relative the screen 34 and screen housing 116, the true north will be indicated by the line 128 and the magnetic or compass heading will show on the compass ring 122.

A transparent plate 148 may be affixed to the top wall 22 around the compass ring 122 and extending over the compass ring 122, the screen housing 116 and the screen 34 to provide weather sealing thereto. A course line 150 may be inscribed on the cover plate 148 from front to back, as shown. Alternatively, the course line may be projected onto the screen 34.

The projection lamp 36 may be contained within a lamp housing 152 which may, for example, extend generally inwardly through an aperture 154 provided in the bottom wall 32 of the housing of the device 20. The lamp housing may be removably secured with the bottom wall 32 in any convenient manner as by means of fasteners, or the like, not shown and may comprise an integral self-contained unit having a socket 156 for receiving the removable projection lamp 36, conductor means 158 for providing electrical power to the projection lamp 36 and connected with a source of power which may be self-contained batteries or an external power supply and with a lamp control switch 160 mounted to the top wall 22 of the housing of the device 20 for turning the projection lamp 36 on and off. If desired, the lamp switch 160 may be constructed and arranged to enable variation of the intensity of the light produced by the lamp 36. Yet further, the lamp housing 152 may comprise a reflector 162 which, together with condenser lens means 164 mounted to the lamp housing 152 provides for illumination of the slide or transparency 114. The lamp housing 152 may yet further be provided with ventilation means, such as a plurality of slots or apertures 166 so as to prevent overheating during operation of the lamp 36. If desired, opal glass or other light diffusing systems may be utilized in place of the condensing lenses 164 to provide for even illumination of the chart transparency 114.

As hereinbefore pointed out, suitable lens means should be disposed between the slide or chart transparency 114 and the rear projection screen 34. Preferably, a lens arrangement having variable magnification should be utilized so that, depending upon the naviational problem involved, a smaller or larger portion of the chart transparency 114 may be displayed on the screen 34 at either increased or decreased magnification, respectively. In other words, when navigating between landmarks or positions which are relatively far apart, as in the middle of a bay or lake, then a lens system utilizing relatively low magnification is to be preferable so that the entire bay or other area involved may be simultaneously displayed on the projection screen 34 but when the navigational problem involves closer navigation, as when entering or navigating within a harbor, then more detail is necessary and an increased magnification, so that a small portion of the chart transparency 114 is projected to cover the entire screen 34 will be found useful. A zoom lens may be utilized so as to provide continuously variable magnification, or, as shown, a turret arrangement whereby a plurality of fixed power lenses may be selectively disposed in the optical axis may be provided so that the degree of magnification will be known for any particular turret position and the navigator or pilot will be able to more readily judge distances on the projected chart since the scaling thereof will be limited to a relatively few choices. For example, with an appropriate selection of the chart transparencies and the magnification of the various turret lenses, the projected image may be limited to certain specific standard ratios such as, for example, 1:10,000; 1:25,000; 1:50,000 and 1:100,000.

Such a turret system may comprise, for example, a turret plate 168 rotatably supported on a generally vertical pivot shaft 170 carried by, for example, a projection 172 projecting inwardly from the housing side wall 28. The turret plate 168 may be provided with a plurality of apertures within which there are positioned a plurality of lens systems 174 each of which may provide a different magnification and each of which may be provided with a scale reticle 175 of proper design to correspond to the size of the lens so that scale markings 176 appropriate to the magnification being provided will be projected on the screen 34. Each of the lens systems 174 should be of proper design to project that portion of the chart transparency that its size dictates to the full size of the screen 34. The lens turret plate 168 may be provided with a plurality of appropriately placed detents 179 extending generally inwardly of its periphery for cooperation with one or more spring loaded ball checks 181 to indicate when a lens system 174 is in optical alignment and to retain the turret plate 168 in the selected position.

The turret plate 168 may be rotated about the shaft 170 as by the upper end portion of the shaft 170 having affixed thereto for rotation therewith a worm gear 178 engaged with a worm 180 carried by a rotatable shaft 182 which in turn is rotatably carried by a shaft 182 rotatably carried on its end portion, for example, by the support 172 and the front wall 24 and provided, adjacent the end portion thereof carried by the front wall 24 with a bevelled gear 184 engaged with a bevel gear 186 rotatable about a generally vertical axis and rotatably connected with a control shaft 188. The turret control shaft 188 may extend generally vertically upwardly through the housing top walls 22 and be provided on its outboard end portion with a lens turret control knob 190. Furthermore, each of the lens systems 174 may contain on the scale reticle thereof a series of circles that would be of a size to project the relative sizes of the higher magnification lenses on the screen so that proper determination of the area of the chart that would be projected by such higher magnification lenses could be made before switching to such lens so that if a desired landmark is near the edge of the chart that would be projected by the next higher magnification lens, the operator of the instrument would know ahead of time whether or not that landmark would show on the screen 34 if he switched to a higher magnification.

A film access door 192 may be provided on the side wall 30 to enable slide transparencies 114 to be readily changed to cover different chart regions. Further, means may be provided, such as a film storage rack 194 on, for example, the inside of the film access door 192 to enable such alternative slides or transparencies 114 to be readily stored.

Since the ability to be able to project and navigate by more than one chart readily and easily could be very advantageous, with particular reference to FIGS. 5 and 6 there is shown, installed in the present invention, a roll film attachment which enables the utilization of a strip of film transparencies, rather than individual slides to depict different charts and, even, charts having differing scales and degrees of detail. For example, and merely by way of illustration, a roll film chart might be utilized which covers a particular river or river system, in which case the roll chart may comprise separate charts covering differing portions of such river or river system at the same or differing scales or may comprise a continuous chart covering the entire river course or the roll chart may cover an entire system or lake region, an entire bay, sound or gulf, including harbors and the like or different water or other bodies, such as the inland waterway of the Eastern Coast of the United States or an entire mountain range or state or other geographic area or substantially any logical area which is too extensive to be included in a single chart frame.

With particular reference to FIGS. 5 and 6, there is shown and illustrated a roll film adapter installed in the navigation device of the present invention which enables the utilization therein of such a roll form chart transparency and positioning of any desired portion thereof in the optical axis.

The roll film adapter, generally designated by the reference character 196 is adapted to be positioned on the slide holder plate 38 and retained thereon, as by means of the clips 42 in place of the slide transparency 114.

The roll film adapter 196 may comprise a frame assembly 198 adapted to be disposed on the slide holder plate 38 and being provided with a shoulder portion 200 for containing within the recess 44 of the slide holder plate 38 in place of the frame or mount of the slide transparency 114. Mounted on the frame member 198, there may be provided a plurality of takeup spools or rollers 202 and 204 disposed on opposite sides of the light passage aperture 40 of the slide holder plate 38 and a corresponding aperture 206 provided in the frame member 198. A recess 208 may be provided within the frame member 198 extending generally peripherally about the aperture 206. A plurality of direction control rollers 210 may be disposed within the recess 208 adjacent the opposite sides of the aperture 206 so that a film or chart portion 212 extended therebetween and therebeneath the aperture 206 will be disposed at a height relative the slide holder plate 38 substantially the same as the slide or transparency 114 would be positioned so that the image projected on the screen 34 will be properly focused. A second pair of rollers 214 may be provided above the frame member 198 on opposite sides of the recess 208 to direct the film to the takeup rollers 202 and 204. As shown, the roll chart 212 may extend from generally underneath the takeup rollers 202 and 204 over the tops of the upper rollers 214 and beneath the lower rollers 210 so as to be maintained appropriately tensioned and flat along the image plane. The end portions of the chart roll 212 may be wound generally oppositely, about the takeup rollers 202 and 204.

A chart roll control knob 216 may be provided extending, for example, upwardly of the top wall 22 of the housing of the device 20 for effectuating rolling of the roll chart 212 between the takeup rollers 202 and 204 and, thereby, across the aperture 206. The control knob 216 may be connected with a rotatable control shaft 218 for rotation therewith and the lower end portion of the control shaft 218 may be provided with a bevelled gear 220 for rotation thereby in a generally horizontal plane. A shaft 222 may be provided extending generally perpendicular the control shaft 218 and rotatable relative the housing of the device 20 and may be provided with a bevelled gear 224 mounted for rotation therewith and engaged with the bevelled gear 220 so that, upon rotation of the chart roll control knob 216, the generally horizontally extending shaft 222 will, in turn, be rotated. The generally horizontally extending shaft 222 preferably extends generally in line with the direction of movement of the outer frame 48. A bevelled gear 226 may be rotatably carried by the outer frame 48 in general axial alignment with the generally horizontally extending shaft 222 with the shaft 222 passing generally centrally therethrough. The portion of the shaft 222 which passes through the bevelled gear 226 may be splined or, as shown, of generally square configuration and the bevelled gear 226 may be provided with a mating splined or square aperture so that the bevelled gear 226 is free to slide along the square or splined portion of the shaft 222 while yet being rotated therewith regardless of its relative position therealong.

Meshed with the bevelled gear 226 and similarly rotatably carried by the outer frame 48, there may be provided mating bevelled gear 228, a shaft 230 having a portion 232 which is similarly splined or of square configuration which may extend outwrdly of the mating bevelled gear 228 for rotation therewith and the square or splined portion thereof may be slidably engaged with a double-threaded worm having oppositely threaded worm teeth 234 and 236 which may be rotatably carried by the inner frame 46 so as to be movable therewith back and forth along the shaft portion 232. A pair of worm gears 238 and 240 may be carried by the inner frame 46 for rotation about a generally vertical axis and having their peripheral teeth engaged and meshed with the worms 234 and 236, respectively, so that, upon rotation of the chart roll control knob 216 and, accordingly, the transverse shaft 230, the worm gears 238 and 240 will be rotated in opposite directions. In other words, if the chart roll control knob 216 is rotated in a clockwise direction, then one of the worm gear, such as the worm gear 238 will be rotated in a clockwise direction and the other of the worm gears 240 will be rotated counterclockwise. Similarly, if the chart roll control knob 216 is rotated in a counterclockwise direction, then the worm gear 238 will be rotated in a counterclockwise direction and the worm gear 240 will be rotated in a clockwise direction.

Adjacent the periphery of the frame member 198, there may be provided a plurality of generally vertically extending shafts or posts 242, each shaft or post 242 carrying a pair of roller members 244 and 246, stacked one above the other so as to be freely rotatable relative one another and relative the frame member 198. Carried by each of the sets of rollers 244 and 246, respectively, there may be provided a pair of ring gears 248 and 250 having outwardly extending teeth or notches 252 and 254, respectively. Each of the notches or teeth 252 and 254 are of generally saw-toothed configuration and, as shown, point in opposite directions.

In other words, the lower ring gear 248 rides or is carried by the lower rollers 244 generally adjacent the frame member 198 and its teeth 252 point generally counterclockwise, as seen from above while the upper ring gear 250 is supported by the upper rollers 246 in generally spaced apart relationship to the frame member 198 and above the lower ring gear 248 and its teeth 254 point in a generally counterclockwise direction. Each of the worm gears 240 and 238, respectively, are provided with spring-loaded pawl members or ratchet arms 256 and 258, respectively, with the ratchet arm or pawl 256 being carried beneath the worm gear 240 and spring biased for movement in a clockwise direction relative thereto as seen from above while the ratchet arm or pawl 258 is carried above the worm gear 238 and is spring biased for movement in a generally counterclockwise direction as viewed from above. The upper ratchet arm or pawl 256 is in general radial alignment with the teeth 254 of the upper ring gear 250 and the lower ratchet arm or pawl 256 is in general radial alignment with the teeth 252 of the lower ring gear 248. Hence, when the chart roll control knob 216 is rotated in a direction to rotate the worm gear 238 counterclockwise, the upper ratchet or pawl 258 will be rotated into engagement with the teeth 254 of the upper ring gear 250 to thereby prevent rotation of that ring gear generally clockwise. Similarly, when the chart roll control knob 216 is rotated in a direction to rotate the worm gear 240 in a clockwise direction, the ratchet arm or pawl 256 will be rotated into engagement with the lower teeth 252 of the lower ring gear 248.

The inside edges of the upper and lower ring gears 250 and 248, respectively, are provided with internal gear teeth 260 and 262, respectively, engaged, respectively, with mating pinion gears 264 and 266 carried, respectively, rotatably on posts 268 and 270 carried by the frame member 198. Mounted for rotation with each of the pinion gears 264 and 266 are bevel gears 272 and 274 for rotation generally horizontally upon relative rotation between the upper ring gear 250 and the frame 198 and the lower ring gear 248 and frame 198, respectively. Meshed with each of the bevel gears 272 and 274 are mating bevelled gears 276 and 278 disposed for rotation in a generally vertical plane and mounted for rotation with the film or chart rollers 202 and 204, respectively.

Accordingly, when the rotation control knob 110 is rotated, the roll film attachment, including the frame member 198 will rotate the same as a slide would. However, when the chart roll control knob 216 is rotated so that the ratchet arms 256 and 258 engage the ring gear ratchet teeth 252 and 254, it being recalled that the worm gears 238 and 240 rotate in opposite directions so that a single direction of rotation of the chart roll control knob 216 is effective to rotate both ratchet arms 256 and 258 inwardly into engagement with the ring gears 248 and 250, continued rotation of the rotation control knob 110 will cause a relative movement between the ring gears 248 and 250 relative the frame member 198. Clockwise rotation of the frame member 198 will cause ratchet arm 258 to prevent movement of the upper ring gear 250 and cause the upper pinion gear 264 to rotate which causes the horizontal bevel gear 272 associated therewith to rotate and thereby rotate the vertical bevel gear 276 which, in turn, causes the film roll 204 to rotate counterclockwise and thus take up film from the bottom of the roll. At the same time, the lower ring gear 248 will be rotating with the frame member 198 and slightly faster as the other of the film rolls 202 rotates as the film is being pulled off it. The lower ring gear will be permitted to over-travel slightly, as necessary, past the ratchet arm 256. Counterclockwise movement of the frame member 198 will cause the lower ring gear 248 to remain stationary relative the housing and the reverse sequence will occur rolling the film in the opposite direction. As film is fed off of one roll and onto the other, the relative sizes of the rolls will change. Hence, two ring gears are preferably utilized so as not to drive one roller while the other pulls. The natural friction of the free ring gear and spool will provide sufficient tension on the film as it is being pulled so as to keep it tight.

After the film has been advanced in either direction, as desired, release of the chart roll control knob 216 will cause retraction of the entire gear train under the impetus of a torsion spring not shown, or the knob can be rotated backwardly by hand. Then, the rotation control knob 110 may be utilized to re-orient the projected chart image. If desired, a button type control, through a sector gear or lever or a rack and pinion arrangement may be utilized to initiate chart advance, rather than the control knob 216. Similarly, the rotation control knob 110 may be constructed and arranged to be vertically movable and, through a similar arrangement, can be utilized to provide chart advance.

Hence, the apparatus as heretofore described, may project a desired chart or chart portion from either a slide or from a roll of chart transparencies at a plurality of differing magnifications upon a screen and, simultaneously, project a course line and reticle thereon while enabling the projected image to be oriented and positioned as desired. Hence, as thus far detailed, the present invention enables the navigation of a vessel or craft or position finding to be accomplished without requiring the utilization of a conventional chart. The necessary calculations of direction and/or distance could, if desired, be carried out directly on the face plate or screen or upon the cover plate 148 utilizing a grease pencil, or the like. However, for maximum utility, it is preferable that no additional drawing instruments be necessary and that the device 20 be constructed and arranged to enable the necessary plot lines to be indicated mechanically in any desired position or orientation and moved as required as position and conditions change but which will yet remain in the last position whereat they were manually set so that the present or last position or course direction may be quickly and easily determined. Such plotting lines or lines of position, indicating the relative line which could be drawn through any two known points to determine the angular orientation thereof relative to, for example, true north or a line which may be drawn through a known point at a known angle which when intersected with another similar line to indicate the position whereat the relative sightings occur may be displayed on the device 20 and such lines may be conveniently referred to as lines of position. In one embodiment of line and position indicator suitable for use in the present invention, projecting upwardly from the top wall 22 of the device 20 generally on opposite sides of the screen 34, there may be provided a pair of guide members 280 having a multiple slot arrangement 282 within which a plurality of generally transparent slide members or slide frames 284 are adapted to be slidably engaged. Each of the slide frames 284 is preferably provided with a generally circular central aperture 286 within which there is rotatably secured, a relative bearing disk upon which there may be inscribed or otherwise provided a plurality of generally parallel lines of position 290. Preferably, the line of position 290 which intersects the center of the relative bearing disk 288 is distinctive from the other lines of position. Means, such as control knob 292 may be mounted, for example, in peripheral contact with each of the relative bearing disks 288 and projecting beyond the periphery of the slide members or slide frames 284 and rotatable therewithin may be provided, for example, on its edges, as well as the edge of the relative bearing disks being provided with knurling, or the like, so that upon finger tip rotation of the control knob 292, the respective relative bearing disks 288 will likewise be rotated. If desired, notches may be provided in the slide frames 284 to enable the edges of the relative bearing disks 288 to be rotated manually directly.

Preferably, three relative bearing disks 288 are provided so that they may be angularly set to indicate three lines of position and, therefore, the intersection therebetween will definitely indicate the correct location or, if desired, two of the lines of position relative bearing disks may be utilized to provide lines of position from known points and the third relative bearing disk may be utilized to indicate the desired course. Preferably, in use, the location from which relative bearings are taken is positioned to the center of the screen 34 so that the central line of position on each of the relative bearing disks will be the line of position utilized. However, since all of the lines of position on a single bearing disk are parallel, the correct relative bearing may be set on the central line of position from the compass rose or ring 122 and that heading determined any place on the screen 34. If desired, means, such as a movable pointer, a movable edge lighting device, or the like, may be utilized to indicate that a line of position other than the central line of position is the line of position under consideration. Storage slides 292 may be provided extending over one of the other walls of the device 20 to enable the slide frame 284 and relative bearing disk 288 carried thereby to be stored and the disks may be moved in the tracks for selective positioning thereof.

Since the utilization of relative bearing disks, as set forth hereinabove, while capable of depicting the necessary navigation information, they do present a relatively cluttered appearance to the screen and the projected image which may be objectionable to some persons. If relative bearing disks are provided which are movable across the face of the screen 34, then the plurality of grid lines are not needed for locating a desired position but, rather, a simple line of position on each relative bearing disk would be sufficient since, after being rotated so as to be set or oriented to have the line set in a desired angular orientation or direction, the disk may be moved across the screen to position the line of position as required. In other words, the frames 282 may be slid in the trackways 280 to position the line of position as desired.

With particular reference to FIG. 7, there is shown and illustrated a version of the navigation device utilizing such bearing disks, each having only a simple line of position 294'. Further, to aid in finely orienting the bearing disks 288a', 288b' and 288c' they may each be provided with a small round aperture 291 intersecting the aperture 286 so that a knob 292' having a reduced diameter stem of what may be a relatively soft material may be inserted therein and used as a handle to both slide the disk and frame within the trackway 280 and rotate the disk through frictional engagement with its edge. Upon removal of the knob 292' nothing will project outwardly of the disk or frame and they will remain as positioned. Mating gear teeth may also be provided on the disks and knob.

In use, the first frame and disk 288a' may be slid into the lowermost groove in the trackways 280 and the disk 288a' centered on the screen. With the knob 292' inserted, the disk 288a' and bearing line 294' may be oriented as desired, as shown in FIG. 7 and then be slid, as indicated in phantom in FIG. 7, to the desired position. Next, the knob 292' may be removed, the disk 288b' oriented and positioned, etc.

Such disks might still tend to obscure the screen image and might be lost or damaged since they are loose from the housing. Therefore, a similarly economic arrangement may be provided to enable manual display of lines of position and such line of position indicators as may be utilized are shown in phantom in FIG. 1 and may comprise, for example, a plurality of line of position pointers or fingers 294 of sufficient length to extend substantially entirely across the screen 34 and which may be pivoted, at one end portion to a slider frame 296 adapted to be slid, for example, along guide members or tracks 298 provided extending from the housing of the device 20. The pivotal connection between the rods or fingers 294 may be provided with relative bearing indicia or each of the rods, fingers, or pointers 294 may be set so that they intersect both the center of the screen 34 which may be provided with a marker, such as a small circle or dot 300 and, simultaneously, the desired or appropriate relative bearing as indicated by the compass ring 122 and then the slider 296 associated therewith slid along the trackway 298, maintaining the relative bearing of the line of position indicator such as a rod, finger or pointer 294 until the line of position indicator overlies, for example, a fixed or known object on which the relative bearing sighting was taken. Then, a second one of the line of position indicators 294 may be similarly adjusted to overlie a second fixed point and indicate the relative bearing thereto and, then, the intersection therebetween will indicate the position from which the relative bearing sights were taken. Again, as with the relative bearing disks 288, preferably three relative bearing pointers or bearing disks 288, preferably three relative bearing pointers or line of position indicators 294 are provided. If desired, each of the sliders 298 may be provided with a bearing scale 302 to enable the line of position indicator associated therewith to be set or read from any position relative the screen 34. However, if one of the line of position indicators 294 is set to cross, for example, two known locations, and the relative bearing therebetween is desired, the slider associated therewith may be slid along its trackway 298 without disturbing the relative angular position of the line of position indicated at 294 relative the slider 296 until the line of position indicator 294 crosses the center marker 300 of the screen 34 and, the intersection of the line of position indicator 294 with the compass ring 122 will indicate the correct or desired relative bearing.

The control knobs 292 for the relative bearing disks 288 may be disposed in general axial alignment with one another or, as shown in FIG. 1, the control knobs 292 for the various relative bearing disks 288 may be disposed in staggered relationship so as to be more easily operated. Hence, if three relative bearing disks are provided which may be designated 288a, 288b and 288c held within three slide members or frames similarly designated 284a, 284b and 284c and controlled by three separate knobs 292a, 292b and 292c, the knobs may be axially offset, one from the other, as shown.

While the relative bearing disks 288 and the rods, fingers or pointers 294 will each permit the solving of the desired navigational problems, and may each be incorporated into the present invention at relatively low cost, each of these line of position indicating systems present several problems. Firstly, since they are external to the housing of the device 20, they are vulnerable to damage and/or loss. Secondly, since the lines of position indicating means of each of these systems provide a shadow over the projection screen, the light from the projection screen tends to obscure the line of position indicators and, therefore, to enable them to be readily visible, they must be relatively wide since a dark object against a light background visually appears smaller than would a light object against a dark background and this tendency is increased under nighttime usage conditions. Hence, for maximum utility, the line of position indicators may be internal to the housing of the device 20 so as not to be readily susceptible to loss and- /or damage and, secondly, it may also be preferable that the line of position indicators be at least as bright or brighter than the projected image. In fact, maximum advantage may be accomplished if both the projected image and the brightness of the line of position indicators may be separately adjusted to enable the relative contrasts therebetween as well as their absolute brightness to be selected based upon the viewing conditions. For example, during daylight usage a greater degree of both absolute brightness and relative brightness would be required for clear visibility while conversely, during nighttime usage, a relatively low level of both absolute brightness and relative brightness or contrast therebetween would be desirable so as to least affect the operator's, pilot's or navigator's "night vision."

Such an internal line of position indicator system may be provided by mounting a light projector within the housing of the device 20 that is designed to emit light along a slit so as to provide a very narrow light beam image across the screen 34 and which is movable in its mounting with the movement controlled from outside from the housing of the device 20 so as to be rotatable relative the screen 34 so that the projected line image will be susceptible to orientation in any desired angle or heading and which is further movable so as to enable the projected line image to be translated or moved across the screen 34, as in FIG. 7. A line of position indicating projector designated generally by the reference character 302 and suitable for use in the present invention is shown and illustrated in FIGS. 8, 9 and 10. The line of position projector 302 may comprise a lens housing 304 containing a lamp and lens assembly 306 for providing a focused beam of light with the housing 304 being provided with a slit aperture 308 in the upper wall 310 thereof to provide a bright line image on the screen 34. The lens housing 304 may be rotatably secured in a support ring 312 so that the slit 308 may be oriented to any desired angular position. A pair of slip rings 314 and 316 may be provided on the lens housing 304 for cooperation with a pair of brushes 318 and 320 connected with electrical connector means 322 and 324, respectively, to enable energization of the lamp during continuous rotation thereof.

The support ring 312 may be pivotally mounted relative the housing of the device 20 as by means of axle portions 326 and 328 extending generally radially outwardly of the support ring 312 and into appropriate bearings mounted with the housing of the device 20. Pivotal or rocking movement of the support ring 312 will, therefore, sweep the line image projected by the lens housing 304 across the screen 34 and enable positioning of such line image where desired thereon.

Rotational control of the lens housing 304 may be provided by means of a generally horizontal bevel gear 330 mounted for rotation therewith and being disposed, for example, generally above the support ring 312. A mating bevel gear 332 disposed generally vertically, may be rotatably carried by the axle portion 328 with the teeth of the bevel gear 332 being enmeshed with the teeth of the bevel gear 330 so that, upon rotation of the vertical bevel gear 332, the horizontal bevel gear 330 and attached lens housing 304 will be rotated. Mounted for rotation with the vertical bevel gear 332, there may be provided a worm gear 334 enmeshed with a worm 336 mounted for rotation relative the housing of the device 20 about a generally vertical axis which may be defined by a generally vertically extending control shaft 338 extending therethrough for rotation therewith. The worm 336 may be keyed to the shaft 338 as by the shaft 338 being of splined or square configuration engaged with a mating aperture extending through the worm 336. A pair of keepers 340 and 342 may be provided generally above and below the worm 336 to retain it positioned relative the worm gear 334 except when rotation of the slit aperture 308 is desired as will be explained hereinafter. The shaft 338 may extend generally vertically upwardly through the top wall 22 of the housing of the device 20 whereat it may be provided with a rotation control knob 344 shown in phantom in FIG. 1. Hence, upon rotation of the rotation control knob 344, the shaft 338 and worm 336 keyed thereto will be rotated to rotate, in turn, the worm gear 334, bevel gears 332 and 330 and, thereby, the lens housing 304.

Mounted with the axle shaft portion 328 for rotation therewith, there may be provided a worm gear 346 so that, upon rotation thereof, the support ring 312 will be rocked, back and forth, sweeping the projected line image across the screen. A worm 348 carried by a generally vertically extending control shaft 350 which may extend generally upwardly through the top wall 22 of the housing of the device 20 can be provided at its upper end portion with a sweep control knob 352 shown in phantom in FIG. 1. Hence, upon rotation of the sweeping control knob 352, the lens housing 304 will be rocked back and forth and the projected line image will sweep across the screen 34.

If the worm 336 were retained stationary, as the ring support 312 was pivoted back and forth, the generally horizontal bevel gear 330 would walk along the bevel gear 332 and thereby produce rotation of the projected image any time a sweep movement was initiated. To preclude such undesirable rotation, as heretofore pointed out above, the worm 336 is slidable relative the shaft 338 so as to remain positioned relative the worm gear 334. The keepers 340 and 342 may be mounted to a generally vertical shaft 354 slidably mounted relative the wall of the housing of the device 20 and a rack 356 may be mounted for movement therewith having its teeth engaged with the worm gear 346. Hence, upon rotation of the worm 348 and, accordingly, rotation of the worm gear 346 to effect pivoting of the support ring 312, the rack 356 and worm 336 will together walk upwardly or downwardly and the worm 336 will therefore remain positioned relative the worm gear 334 and no undesired rotation of the lens housing 304 will occur.

As in the earlier described line of position indicators, preferably three projectors and sets of control knobs, designated A, B and C are preferably provided. The projectors may be disposed approximately 120° apart around the center of the screen 34 and the control knobs may be disposed as shown in FIG. 7.

Under certain conditions, it may be advantageous to enable a single input means to be usable to set any of the relative bearing markers to a desired heading. A single input shaft geared to each of the control shafts 338 through clutch arrangements could perform such an input function. However, for yet greater utility, means may be provided to enable the relative bearing markers or line of position indicators to be set to a desired angle orientation from a remote location and this may be most readily accomplished with electrical control systems. Hence, and with reference now to FIGS. 11–13, there is shown and illustrated a line of position indicating projector 302' similar to the projector 302 described above but which is provided with means to enable electrical control of the rotational position of the projected line of position. The projector 302' is substantially similar to the projector 302 and where similar parts may be utilized in the two projectors, similar reference characters will be used except that the reference characters will be primed where the parts differ. Hence, the axle shaft 328' of the projector 302' is elongated so that the bevel gear 332 and the worm gear 334 are slidable therealong so that the teeth of the bevel gear 332 may be selectively engaged with and disengaged from the teeth of the horizontal bevel gear 330. Further, the worm gear 334' may be widened so as to remain engaged with the worm gear 336 during sliding movement along the axle shaft 328'. A shifting fork or frame 358 may be disposed between the bevel gear 332 and the worm gear 334' to slidably move the gears along the axle shaft portion 328'. The shifting fork or frame 358 may be connected at its upper end portion with an upper pin 360 and at its lower end portion with a lower pin 362 which are respectively mounted eccentrically to gears 364 and 366 which are, in turn, engaged with fixed racks 368 and 370, respectively. The gear wheels 364 and 366 may be rotatable about stub axles 372 and 374 carried by collars 376 and 378 disposed about the control shaft 338'. The collars 376 and 378 are provided with through apertures so that the control shaft 338' is freely rotatable therewithin and means, such as keeper rings 380, 382, 384 and 386 may be structurally associated with the shaft 338' on opposite sides of the collars 376 and 378 so that, upon vertical movement of the control shaft 338', the collars 376 and 378 will move therewith. Accordingly, rotational movement of the control shaft 338' will not have any effect on the shifter fork or frame 358 but, upon vertical reciprocation of the control shaft 338' the collars 376 and 378 will also move vertically, as will the gear wheels 364 and 366. As the gear wheels 364 and 366 are reciprocated, their engagement with the fixed racks 368 and 370 will provide rotation thereof and, therefore, movement of the shifter fork 358 generally perpendicular the axle shaft 328' to cause engagement and disengagement of the bevel gears 330 and 332.

A follower 388 within which the control shaft 338 may freely rotate may be connected therewith, as by means of keepers 390 and 392 so as to reciprocate therewith may be provided. The follower 388 may be provided with a plurality of grooves 394 within which a spring loaded ball 396 may be engaged so as to retain the shaft 338 in either its upper position whereat the bevel gears 330 and 332 are disengaged and its lower position whereat the bevel gears 330 and 332 are engaged, respectively. Further, the follower 388 may actuate an electric switch arrangement 398 so as to close a plurality of circuits therethrough when in the upper position and open those same circuits when in the lower position. Hence, when the control rod 338 is lifted to its upper position, the switch 398 is closed and the bevel gears 330 and 332 are disengaged enabling the lens housing 304' to freely rotate.

Mounted with the support ring 312, generally beneath the lens housing 304, there may be provided a motor housing 400 within which there may be provided a control motor 402 having its output shaft or armature 404 connected with the lens housing 304 for rotation therewith. Hence, upon actuation of the control motor 402, the lens housing 304 will be rotated and positioned.

The motor 402 is preferably of the type whereat its armature position may be electrically controlled such as the type of motor sold under the trademark "Selsyn" wherein two similar units, one being referred to as a transmitter and one as a follower are electrically connected together and wherein the shaft of the follower motor will rotate identically with input rotations of the transmitter motor. The control motor 402 is of the follower type although it will be understood that in small units the transmitter and follower motors are usually identical.

Hence, if the control motor 402 is connected, as through its electrical leads 406 to a transmitter motor connected, for example, with a radio direction finder aerial or optical sight, then the armature shaft 404 and, accordingly, the lens housing 304 will automatically point to the same bearing as the radio direction finder or optical sight.

The electrical wires or leads 406 of the control motor 402 may be so connected through the switch system 398. Hence, when the control shaft is in its upper position, as shown, the electrical connections between the control motor 402 to the associated transmitter motor of a radio direction finder, or the like, will be completed and if the radio direction finder is oriented to take a specific bearing and then the control shaft 338 be pressed to its lower position whereat the switch 398 is opened and the gears 330 and 332 meshed, the projector 302' will remain set to the sighted bearing. Then, if a second projector within the device has its control shaft 338 pulled upward and the radio direction finder rotated to a second bearing, the second line of position projector will then be automatically set to the second bearing and the intersection of the two projected lines will indicate the location of the craft. With the control shaft 338 in its lower position, therefore, the projector 302' will remember the last bearing electrically entered therein and bearings may be manually entered therein by merely rotating the control rod ro shaft 338'. After each relative bearing is entered, whether mechanically or electrically, the position control knob 352 may be utilized to move that line of position to cross the chart marker for that station.

A navigation device utilizing such projected image line of position indicator is shown in FIG. 14.

Since all of the shafts extending through the housing need only move in rotation or axial sliding motion, weather-proofing of the device may be readily accomplished.

While the invention has been described, disclosed, illustrated and shown in terms of an embodiment or modification which it has assumed in practice, the scope of the invention should not be deemed to be limited by the precise embodiments or modifications herein described, disclosed, illustrated or shown, such other embodiments or modifications as may be suggested to those having the benefit of the teaching herein being intended to be reserved especially as they fall within the scope and breadth of the claims here appended.

What is claimed is:

1. Navigational device comprising, in combination, a housing supporting a projection screen, means mounted with said housing for supporting a miniature navigational chart, means for projecting an enlarged image of at least a portion of said chart on said screen and a plurality of line of position indicators each of which has a single linear element to define only a single line of position, means for independently manually rotating said line of position indicators relative to said screen for setting to a desired bearing or heading and means for independently manually translating said line of position indicators relative to said screen while maintaining the set bearing thereof for indicating relative bearing sights.

2. Navigational device defined in claim 1 wherein such navigational chart comprises a transparency, said chart support means comprises a frame having an aperture therethrough and said means for projecting comprises means for illuminating said chart from one side thereof and multiple magnification lens means disposed between said screen and the other side thereof.

3. Navigational device defined in claim 2 wherein said multiple magnification lens means comprises a plurality of fixed magnification lens systems mounted in a turret, means manually operable from external of said housing for moving said turret between a plurality of positions, each position thereof disposing one of the lens systems in optical alignment between said chart frame and screen.

4. Navigation device defined in claim 3 wherein at least one of said lens systems is provided with a comparison reticle for projecting an indication on the screen of the chart area that would be projected by at least one other of said lens systems.

5. Navigation device defined in claim 3 wherein each of said lens systems is provided with a scale reticle for indicating on said screen the scale of the projected chart.

6. Navigation device defined in claim 2 wherein said chart support frame is movable relative said housing and wherein there is further provided manually operable means generally external said housing for controlling movement of said chart support frame so that any desired portion of the chart may be centered on said screen.

7. Navigation device defined in claim 6 wherein said chart support frame is rotatable relative said housing and there is further provided manually operable means for controlling rotation of said chart support frame so that the chart may be properly oriented.

8. Navigation device defined in claim 2 wherein said chart support frame is rotatably mounted with an inner frame, said inner frame is slidably mounted with an outer frame for movement in a first direction relative said housing and said outer frame is slidably mounted with said housing for movement in a second direction generally perpendicular said first direction together with rotation control means manually operable from externally of said housing for controlling rotation of said chart support frame, inner frame control means manually operable from externally of said housing for controlling movement of said inner frame in said first direction and outer frame control means manually operable from externally of said housing for providing movement of said outer frame in said second direction.

9. Navigation device defined in claim 8 wherein said outer frame control means comprises a screw having a longitudinal axis extending generally in said second direction rotatable relative said housing, a nut mounted for movement with said outer frame engaged with said screw so that rotation of said screw will provide movement of said outer frame therealong back and forth in said second direction, a shaft extending through said housing, a control knob mounted with the outboard end portion of said shaft and means operably connecting said shaft and said screw so that rotation of said control knob provides rotation of said screw.

10. Navigation device defined in claim 9 wherein said operable connecting means comprises a plurality of shafts and meshed gears.

11. Navigation device defined in claim 8 wherein said inner frame control means comprises a screw mounted for rotation relative said outer frame with its longitudinal axis extending generally in said first direction, a nut mounted for movement with said inner frame control means along said screw, a shaft extending through said screw and keyed thereto for rotation therewith while enabling sliding movement of said screw along said shaft, a pinion gear mounted for rotation with said shaft, a worm engaged with said pinion gear rotatably carried by said outer freame with its longitudinal axis extending in said second direction, a shaft extending through said worm and keyed thereto for rotation therewith while enabling sliding movement of said worm therealong, said shaft being carried by said housing, a control shaft extending outwardly of said housing and provided on its outboard end portion with a control knob and means operatively connecting said control shaft with said second-mentioned shaft so that, upon rotation of said control knob, said second shaft and said worm will rotate regardless of the position of said worm along said second-mentioned shaft to thereby rotate said pinion gear, said first-mentioned shaft and said screw regardless of the position of said screw along said first-mentioned shaft and produce movement of said inner frame in said first-mentioned direction.

12. Navigation device defined in claim 11 wherein said chart support control means comprises a control knob disposed generally externally of said housing, a control shaft mounted for rotation with said control knob and extending inwardly through said housing, a control gear mounted relative said housing generally interiorly thereof generally adjacent said outer frame and having the rotational axis thereof generally aligned with said second direction, a second shaft rotationally carried by said outer frame with its rotational axis superimposed with the rotational axis of said control gear and extending therethrough, said second shaft being keyed to said control gear for rotation therewith while being yet slidable axially relative thereto, means for operatively connecting said control gear with said control shaft for rotation therefrom, a worm carried by said second shaft for rotation therewith, a pinion gear carried by said outer frame engaged with said worm and having its rotational axis generally perpendicular thereto and extending generally parallel said first direction so as to pass adjacent said inner frame, a third shaft rotationally carried by said inner frame slidably extending through and being keyed to said pinion gear for rotation thereby while being yet slidable relative thereto, a second worm carried by said third shaft for rotation therewith generally adjacent said chart support frame and a ring gear mounted for rotation with said chart support frame engaged with said second worm for rotation thereby.

13. Navigation device defined in claim 8 further comprising a roll chart adapter mounted with said chart support frame and having a pair of rollers disposed on opposite sides of said aperture for enabling the end portions of a strip form chart transparency to be selectively positioned by rolling onto either said rollers, a bevel gear mounted for rotation with each of said rollers, a mating bevel gear operatively associated with each of said roller bevel gears rotatable generally perpendicular said chart support frame, a pinion gear mounted for rotation with each of said mating bevel gears, one of said pinions extending towards said chart support frame and the other of said pinions extending generally outwardly thereof, a pair of superposed internal ring gears mounted for rotation relative said chart support frame in a pair of planes generally parallel thereto and engaged, respectively, with each of said pinion gears and means for selectively latching each of said ring gears relative said inner frame so that, when latched, rotation of said chart support frame will cause rotation relative that latched ring gear and, thereby, movement of said rollers.

14. Navigation device defined in claim 13 wherein said ring gear latching means comprises a pair of worm gears carried by said inner frame and mounted for rotation relative thereto generally parallel and adjacent each other and said ring gears, oppositely directed ratchet teeth provided on the outer periphery of each of said ring gears, pawl means carried by each of said worm gears for engagement with a respective one of said sets of ratchet teeth upon rotation of said worm gears in opposite directions, a pair of oppositely threaded worms mounted with a common shaft for rotation therewith and respectively engaged with each of said worm gears and means for rotating said common shaft selectively in either direction to thereby selectively engage a respective one of said pawls with the associated ring gear so that, upon rotation of said common shaft rotating means in a first direction, one of said ring gears will be latched against movement in a first direction and upon rotation of said common shaft rotating means in the opposite direction, the other of said ring gears will be similarly restrained while each of said ring gears will be enabled to rotate without substantial restraint in the opposite direction.

15. Navigation instrument defined in claim 1 wherein said screen is of generally circular configuration and wherein there are further provided means for movably displaying a compass rose substantially peripherally around said screen in any selected orientation relative thereto and means for indicating a course line on said screen.

16. Navigation device defined in claim 15 further comprising means for enabling said compass rose to rotate with said screen, means for rotating said screen to maintain orientation with the projected chart and means for moving said compass rose relative said screen to enable setting of variation.

17. Navigation device defined in claim 16 further comprising means for rotating said chart support comprising, in turn, a rotation control knob extending outwardly of said housing, a control shaft structurally associated with said control knob for rotation therewith extending inwardly of said housing, means operatively connecting said control shaft with said chart support frame to provide selective rotation thereof, a pinion gear carried by said control shaft for rotation therewith and a ring gear mounted with said screen and meshed with said pinion gear to provide rotation of said screen at a rate substantially identical with the rate of rotation of said chart support frame.

18. Navigation device defined in claim 16 wherein said compass rose comprises an annular ring extending about the periphery of said screen and frictionally connected therewith so as to normally move therewith while yet enabling said screen to move independently thereof when said annular ring is restrained together with means for selectively restraining said rose ring relative said housing.

19. Navigation device defined in claim 18 wherein said restraining means comprises a pin reciprocable relative said housing disposed generally beneath said compass ring and extendable into engagement therewith, at least one indentation extending upwardly into said compass ring for engagement by said pin to lock said ring relative said housing, and manually operable means structurally associated with said housing and extending generally outwardly thereof for moving said pin into engagement with said indentation.

20. Navigation device defined in claim 1 wherein each of said line of position indicators comprise a slider, means structurally associating said slider with said housing for straight line movement relative thereto, an elongated rod-like finger or pointer pivotally mounted with said slider for adjustment relative thereto to a desired bearing or direction and extension across said screen and means for indicating the heading or angle to which the indicator is set.

21. Navigation device defined in claim 20 wherein said heading indicating means comprises a compass rose extending generally peripherally around said screen and means indicating the center thereof so that each of said sliders may be slid and the respective pointer rotated so as to cross both the center and the desired bearing marker and then without further rotation of said pointer relative said slider, said slider may be moved to transfer that heading to a desired location of the projected chart.

22. Navigation device defined in claim 20 wherein said heading indicating means comprises a scale associated with each of said sliders for setting the respective pointer to the desired angle.

23. Navigation device defined in claim 1 wherein said line of position indicators each comprise a transparent disk having only one line scribed thereacross and means for independently translationally and rotatably supporting each said disk superposed and oriented relative said screen.

24. Navigation device defined in claim 23 wherein said mounting means comprises a generally rectangular frame having a generally circular aperture with said disk being rotatably disposed within said aperture and a pair of trackways mounted with said housing on opposite sides of said screen so that said frame may be slidably carried therein enabling said disk to be rotated to a desired relative bearing and slidably positioned as desired relative said screen.

25. Navigation device defined in claim 24 wherein each of said disks comprises a plurality of parallel lines, enabling the relative angle thereof to be set by the central line and transferred to any other desired line.

26. Navigation device defined in claim 25 further comprising a control knob in peripheral contact with each of said disks and extending generally outwardly of said frame to enable said disk to be rotated at a reduced ration for fine positioning thereof.

27. Navigation device defined in claim 23 further comprising a control knob adapted to be peripherally engaged with each of said disks to enable said disk to be rotated at a reduced ratio for fine positioning thereof.

28. Navigation device defined in claim 27 wherein each of said frames is provided with a relatively small control aperture peripherally intersecting said disk aperture and wherein said control knob comprises an enlarged head and a reduced diameter stem, said reduced diameter stem being adapted to be engaged into said control aperture to engage the edge of said disk for rotation thereof and be subsequently removed so that the disk will remain at the desired setting.

29. Navigation device defined in claim 1 wherein each line of position indicator comprises a light source constructed and arranged to project an elongated line image on said screen, means for enabling rotation of said light source about the optical axis thereof so that the projected line image may be angularly oriented relative said screen and means for enabling movement of said light source to sweep said projected line image across said screen and be thereby positioned as desired relative thereto.

30. Navigation device defined in claim 1 wherein each line of position indicator comprises a support ring, a light source rotatably carried by said support ring constructed and arranged to project an illuminated line on said screen, means for mounting said support ring with said housing for pivotal movement relative thereto about an axis extending generally perpendicular for rotational axis of said light source, means for rotating said light source to orient said illuminated line in substantially any desired angular orientation, and means for pivoting said support ring about said perpendicular axis for sweeping said illuminated line across said screen to substantially any desired position thereon.

31. Navigation device defined in claim 30 wherein said means for pivoting comprises a worm gear operatively associated with said support ring for rotation therewith, a worm engaged with said worm gear to provide rotation thereof upon rotation of said worm while holding said worm gear against rotation when said worm is not being rotated and means manually operable from generally exteriorly of said housing for rotating said worm.

32. Navigation device defined in claim 31 wherein said support ring mounting means conprises an axle extending generally perpendicularly outwardly thereof, said worm gear is mounted with said axle for rotation therewith and said light source rotation means comprises a first bevel gear mounted with said light source for rotation therewith, a second bevel gear rotationally carried by said axle generally perpendicular and engaged with said first bevel gear, a worm gear rotationally carried by said axle mounted with said second bevel gear for rotation therewith, a worm engaged with said worm gear to provide rotation thereof upon rotation of said worm while holding said worm gear against rotation when said worm is not being rotated and means manually operable from generally exteriorly of said housing for rotating said last-mentioned worm.

33. Navigation device defined in claim 32 further comprising means for rotating said last-mentioned worm gear during rotation of said first-mentioned worm gear while enabling rotation of said last-mentioned worm gear independently of said first-mentioned worm gear to preclude said first bevel gear from walking about said second bevel gear during such pivotal movement of said light source.

34. Navigation device defined in claim 33 wherein said last-mentioned means comprises means for supporting said last-mentioned worm while permitting axial movement thereof and means operatively associated with said first-mentioned worm gear for moving said last-mentined worm generally axially generally proportionally the rotation of said first-mentioned worm gear so that said last-mentioned worm gear may rotate similarly to rotation of said first-mentioned worm gear and said bevel gears will remain generally fixedly positioned relative one another.

35. Navigation device defined in claim 34 wherein said last-mentioned means comprises a rack engaged with said first-mentioned worm gear structurally associated with said worm support means for movement therewith.

36. Navigation device defined in claim 35 wherein said last-mentioned manually operable means comprises a shaft slidably engaged through and keyed to said last-mentioned worm for rotation therewith regardless of the relative axial positions thereof.

37. Navigation device defined in claim 32 further comprising motor means carried by said support ring for enabling remote rotation of said light source and means for selectively disengaging said light source from said last-mentioned manually operable means.

38. Navigation device defined in claim 37 wherein said motor means comprises a self-synchronised receiver motor so as to enable said light source to automatically track and be aligned with a self-synchronised transmitter.

39. Navigation device defined in claim 37 wherein said second-mentioned bevel gear is slidable along said axle and wherein said disengaging means comprises means for sliding said second-mentioned bevel gear along said axle so as to selectively engage and disengage said first and second bevel gears.

40. Navigation device defined in claim 39 further comprising means manually operable from said generally exteriorly said housing for controlling said bevel gear moving means and switch means controlled by said last-mentioned manually operable means for automatically providing an electric circuit to the associated self-synchronised receiver upon disengagement of said bevel gears.

* * * * *